United States Patent [19]

Abraham et al.

[11] Patent Number: 5,684,943
[45] Date of Patent: Nov. 4, 1997

[54] METHOD AND APPARATUS FOR CREATING VIRTUAL WORLDS

[75] Inventors: Arthur Abraham, Oakland; John Owen Bumgarner, Morgan Hill, both of Calif.

[73] Assignee: VPL Research, Inc., Redwood City, Calif.

[21] Appl. No.: 413,940

[22] Filed: Mar. 30, 1995

Related U.S. Application Data

[63] Continuation of Ser. No. 302,471, Sep. 12, 1994, abandoned, which is a continuation of Ser. No. 141,205, Oct. 1, 1993, abandoned, which is a continuation of Ser. No. 620,429, Nov. 30, 1990, abandoned.

[51] Int. Cl.⁶ ............................................... G06T 15/70
[52] U.S. Cl. ..................... 395/173; 395/135; 395/119; 395/952; 345/121; 345/8; 345/114; 348/121
[58] Field of Search ............................ 395/152, 154, 395/161, 135, 119–127, 173–175, 327, 806–807, 949–960; 345/7–9, 122, 121, 113–115, 187; 348/121–124, 36–39, 42, 51–53, 216–219, 231; 434/38, 40, 69, 258, 307 R; 273/433–439; 364/578; 396/322, 335–337

[56] References Cited

U.S. PATENT DOCUMENTS

| | | | |
|---|---|---|---|
| 4,107,854 | 8/1978 | Bougon | 35/25 |
| 4,442,495 | 4/1984 | Sukonick | 345/123 |
| 4,549,275 | 10/1985 | Sukonick | 395/121 |
| 4,595,252 | 6/1986 | Lorimer | 350/3.79 |
| 4,600,919 | 7/1986 | Stern | 395/152 |
| 4,645,459 | 2/1987 | Graf et al. | 434/43 |
| 4,868,682 | 9/1989 | Shimizu et al. | 358/335 |
| 4,970,666 | 11/1990 | Welsh et al. | 395/123 |
| 5,090,909 | 2/1992 | Kellar et al. | 434/43 |
| 5,130,794 | 7/1992 | Ritchey | 348/39 |
| 5,255,211 | 10/1993 | Redmond | 364/578 |
| 5,286,202 | 2/1994 | de Gyarfas et al. | 434/43 |

OTHER PUBLICATIONS

Ditlea, "Another world: inside artificial reality", PC–Computing, v2 n11, pp. 90–101 Nov. 1989.

*Primary Examiner*—Joseph H. Feild
*Attorney, Agent, or Firm*—Oblon, Spivak, McClelland, Maier & Neustadt, P.C.

[57] ABSTRACT

A computer receives animated images together with a real world image. The computer then superimposes the animated images onto the real world image. The result is a combined animated/real image which forms the virtual world. The combined image is capable of moving as the user's head moves. Thus, complicated virtual worlds may be created without the programming complexity which would result if the entire image were animated.

13 Claims, 12 Drawing Sheets

METHOD AND APPARATUS FOR CREATING VIRTUAL WORLDS

This application is a Continuation of application Ser. No. 08/302,471, filed on Sep. 12, 1994, now abandoned, which is a Con of Ser. No. 08/141,205 filed Oct. 1, 1993 abandoned, which is a Con of Ser. No. 07/620,429 filed Nov. 30, 1990 abandoned.

BACKGROUND OF THE INVENTION

This invention relates to virtual reality systems and, more particularly, to a method and apparatus for creating virtual worlds.

Users of computer systems are now able to create virtual realities which they may view and interact with. One type of virtual reality system is disclosed in U.S. patent application No. 08/133,802, U.S. Pat. No. 5,588,139, which is a continuation of U.S. patent application Ser. No. 07/535,253, filed Jun. 7, 1990 now abandoned, entitled "Virtual Reality Network," the disclosure of which is incorporated herein by reference. One task which must be performed is the creation of the virtual worlds within which the users interact. This can be a very tedious task, since a complete description of all virtual objects in the virtual world, including their constraints of motion, hierarchy, color, texture and other attributes must be made and entered into the virtual reality computer. Thus, it is desirable to make virtual world creation as simple as possible.

SUMMARY OF THE INVENTION

The present invention is directed to a virtual reality system wherein graphical images are superimposed upon real world images to create virtual worlds. In one embodiment of the present invention, a computer receive animated images together with real world images. The computer then superimposes the graphical image onto the real world image. The result is a combination animated/real image which forms the virtual world. The image is capable of moving as the user's head moves. Thus, complicated virtual worlds may be created without the programming complexity which would result if the entire image were animated.

DETAILED DESCRIPTION OF THE SPECIFIC EMBODIMENTS

The purpose of VideoSphere is to add a realistic-looking video background to the computer generated graphics of a Virtual Reality (VR) system. The video image moves in synchronization with the computer graphics to seem to be part of the same image.

The usual VPL VR system consists of a control computer which receives input from a DataGlove and location sensors worn by the user. There is a location sensor on the Data-Glove and a second one is worn on the EyePhone mounting. These readings are used to construct commands which are sent to the graphics computers, which in turn produce images which are fed to the user via the EyePhones.

For the VideoSphere system, several pieces of equipment are added. The control computer has two video boards added internally, each video board provides a video signal to a Digital Video Effects (DVE) processor. The output from the DVE is sent to a Matting or Overlay processor, where it is combined with the a signal from one of the graphics computer. This combined signal is finally fed to the EyePhones, and seen by the user. The readings from the second location sensor, which indicates the direction in which the user is looking, are used in the VideoSphere system.

Figure 1:
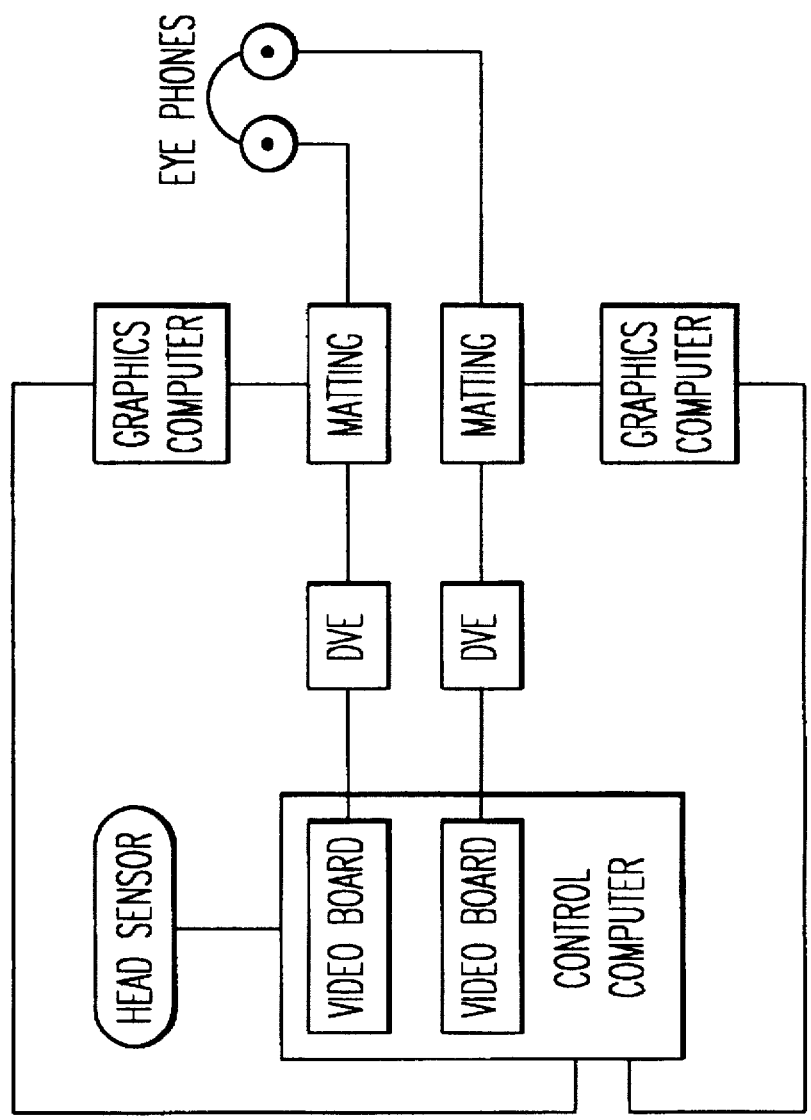
FIG. 1 is a block diagram of an apparatus for combining animated and real images according to the present invention.

The connections between the components used in the VideoSphere system are shown in FIG. 1. (Note that, for simplicity, this does not show the complete VR system which would also include the DataGlove and its location sensor.)

As the user's head moves, the viewpoint in the VR graphics changes. For these graphics the user can move in location in three dimensions (left/right, forward/backward, and up/down), and can also tilt her head up and down (pitch), rotate it from side to side (yaw), or rotate it around the viewing axis (roll)

The VideoSphere graphics are presented as if on the horizon, so are only subject to the pitch, yaw, and roll movements. They must, of course, perform these movements to the same extent as the VR graphics do.

Yaw and a part of pitch are handled within the video boards. These are configured so as to hold a 360 degree view of the video scene. At any instant, depending on the location of the head as read from the head sensor, the portion of this panoramic view that is actually visible is selected for output from the video boards. Roll and the remainder of pitch are handled in the DVE processors. The control computer sends signals to these processors instructing them to rotate the video image, and to raise or lower it, as required to by the user's head movements.

The software program in the control computer reads the position of the user's head and commands the appropriate view from the video boards and the DVE processors.

The matting processors receive two inputs: one from the DVE processors, and one from the graphics computers. The computer graphics are placed on top of the video images, and the composite image is sent to the EyePhones.

To provide the viewer with stereo, two complete video generation systems are required.

The important parts of this system are:
  The video frame buffers and the yaw (horizontal) and pitch (vertical) scrolling that occurs within them.
  The DVE processors that control the roll and part of the pitch.
  The matting that combines the background and the graphics video.
The software programs in the control computer that control the operation of the video frame buffers and the DVE processors.

Figure 2:
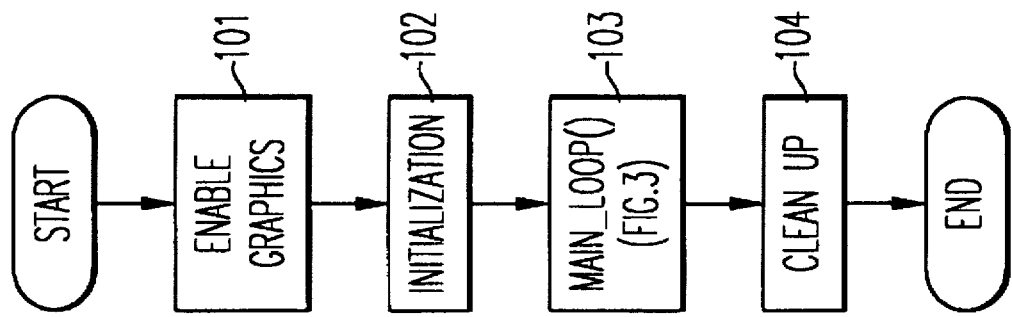
FIG. 2 is a flowchart illustrating the operation of the preferred embodiment of the current invention.

Turning now to FIG. 2, FIG. 2 illustrates a flowchart which contains part of the process used by the present invention. After starting, step 101 initializes the graphics, display subsystems and video cards to prepare to display background images. Step 102 initializes any variables that the program needs to set. Step 103 processes events in response to user inputs. These events include keyboard, mouse and other windowing events. This process continues until the user chooses to quit the program. After the user decides to quit, step 104 performs the clean-up process which includes restoring video card states.

Figure 3:
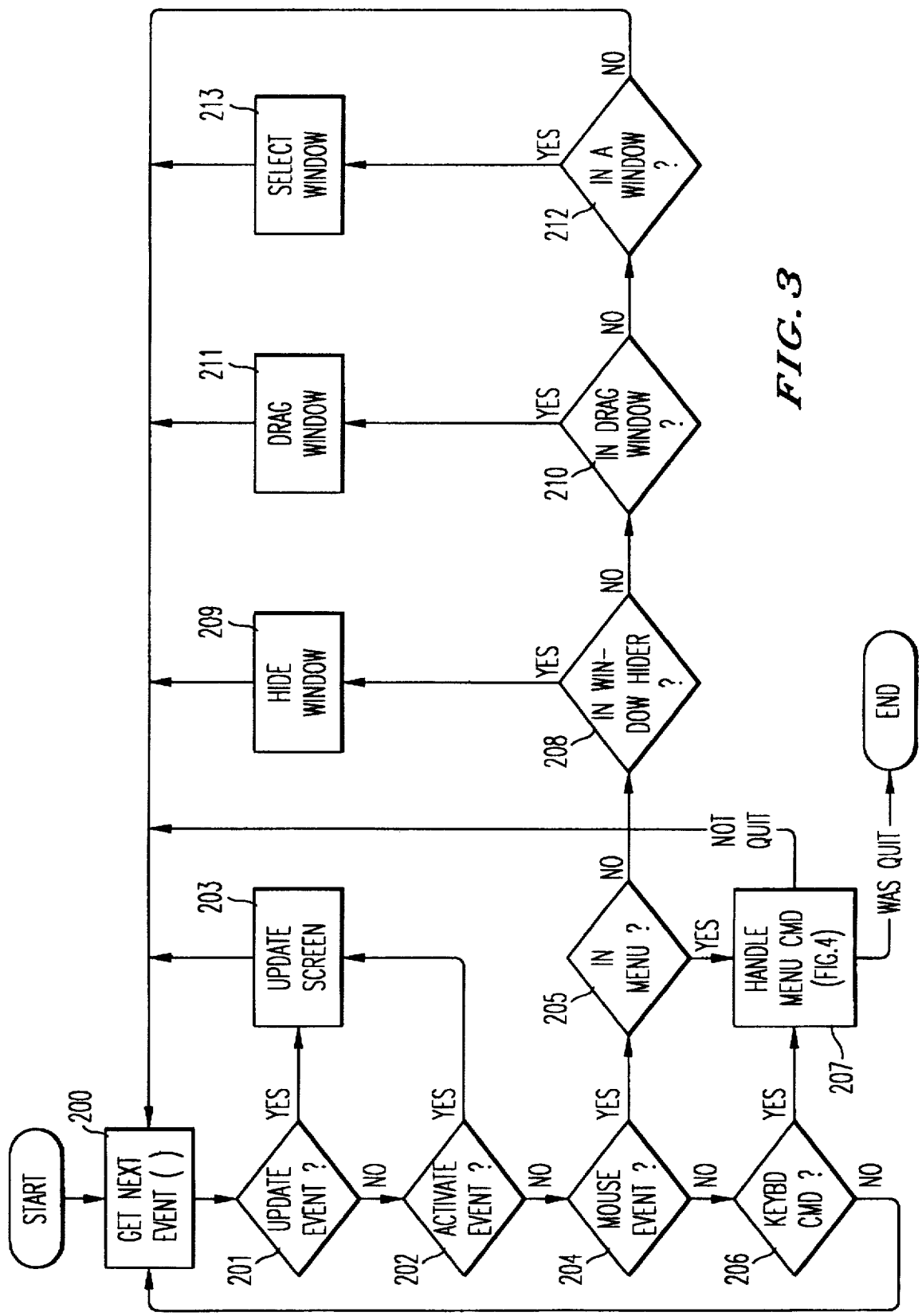
FIG. 3 is a flowchart that depicts how the current invention responds to particular events.

FIG. 3 is an expanded view of step 103 and depicts how individual events are handled by the invention. Step 200 waits until an event occurs and remembers the type of event after it occurs. Steps 201 and 202 determine if it is a windowing event, (eg. in response to revealing part of a previously obscured window), and if so, step 203 updates the screen.

Step 204 determines if the event received was a mouse event, and if so, it performs checking in steps 205, 208, 210 and 212 to determine the type of mouse event. If step 205 determines that the mouse was depressed in the menu bar, it proceeds to step 207 to handle the menu command. If step 208 determines that the mouse was depressed in the hide area, step 209 hides the window. If the mouse was depressed in the drag area, step 210 proceeds to step 211 and the movement of the window is tracked. If the mouse was depressed in any other part of a window, that window is made active by step 213.

Step 206 of FIG. 3 determines if the received event was generated by the keyboard. If it was not, the event was either not supported or was previously processed, so the invention waits for the next event by returning to step 200. If the event was a keyboard event, then the invention proceeds to step 207 to determine what command to execute.

Figure 4:
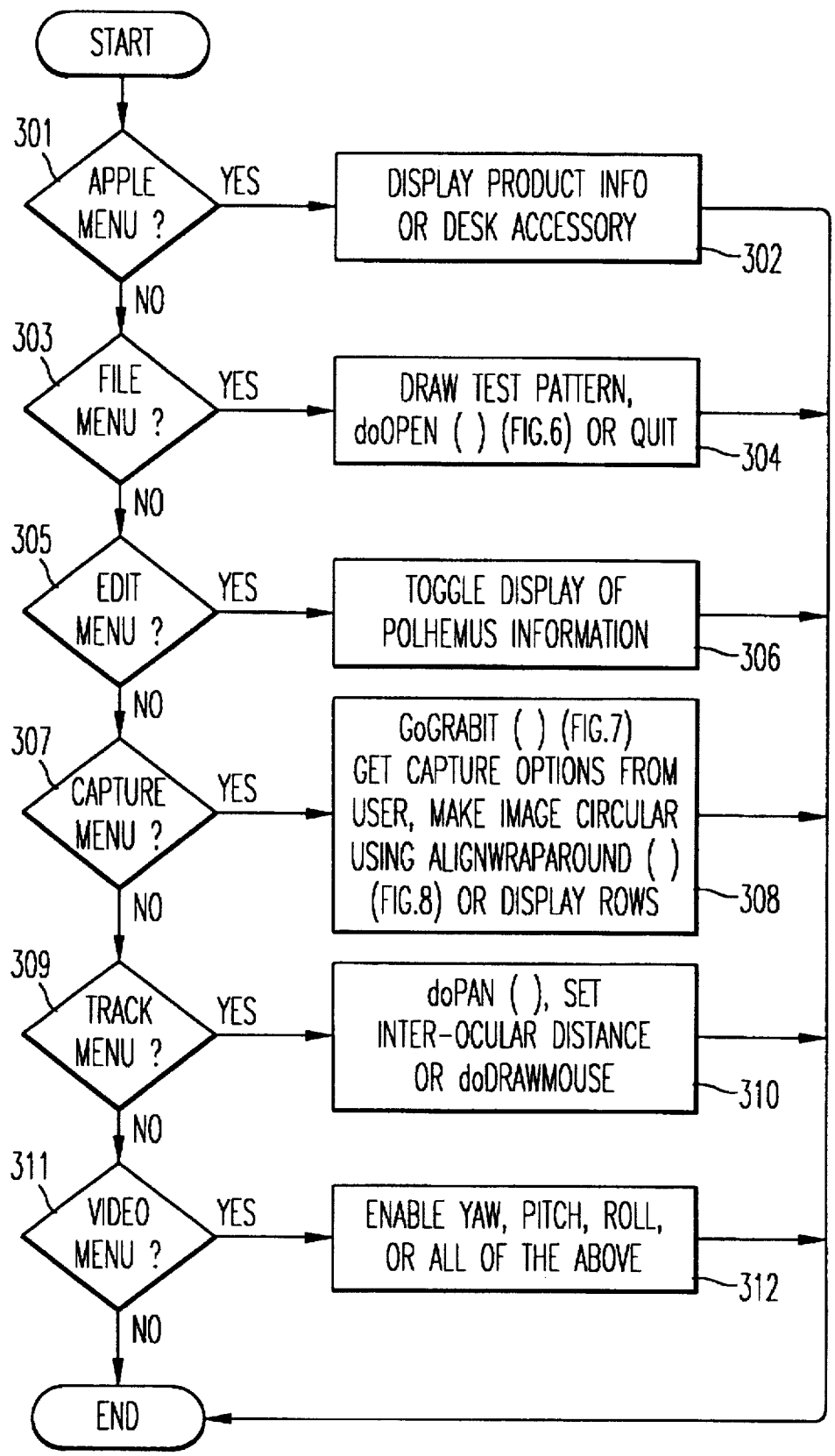
FIG. 4 is a flowchart which shows how the invention responds to the selection of menu items.

FIG. 4 illustrates in greater detail the process of step 207 which executes the command requested by the user through either the mouse or the keyboard. If step 301 determines that one of the Apple menu choices was chosen, step 302 determines which choice and displays product information or the chosen Desk Accessory appropriately. If step 303 determines that a file menu command was chosen, step 304 draws a test pattern on the screen, opens a user specified file, or allows the user to exit and terminate the process performed by the invention. If step 305 determines that the requested command was an edit command, step 306 beeps if the menu option was an unsupported edit command (cut, copy, paste or undo), or step 306 toggles the display of device information.

Step 307, still of FIG. 4, determines if the user is requesting a command from the capture menu. If so, step 308 directs the command to the appropriate sub-step. These sub-steps either grab an image from a camera, alter the options used for grabbing an image, align a previously captured image so that it produces a circular image or instruct the system to stop grabbing images and display the current image. Step 309 determines if the user wants to view an image or change the way that the stereo image looks. If the user wants to view previously captured parts of an image, Step 310 invokes sub-steps to track the mouse position and to pan the image right or left depending on the direction of the mouse. Step 310 can also change the interocular distance of the right and left eyes to change the depth of an image as perceived by a user wearing a stereo image display. Step 311 checks for video commands, and if found, invokes step 312 to enable different degrees of freedom when viewing the image.

Figure 5:
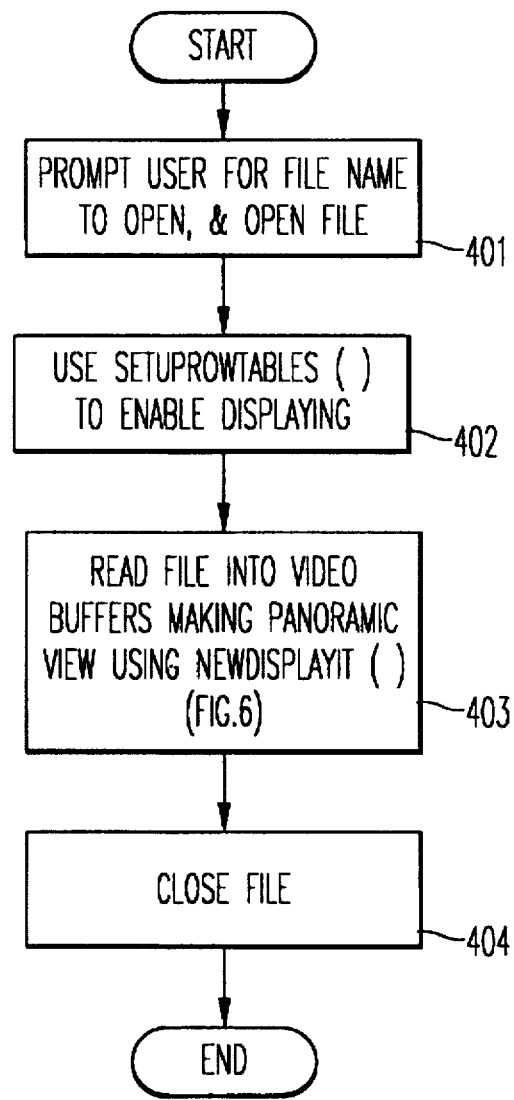
FIG. 5 is a flowchart which represents how a user is prompted for a file, how the video cards are initialized, how a panoramic view is read in from the specified file and displayed using the video adapters.

FIG. 5 illustrates the steps utilized to read a background file and display it. Step 401 prompts the user for the name of a file containing a background and opens the file. Step 402 makes sure that the graphics cards are ready to display the image. Step 403 requests that a sub-step read the file and display it, and step 404 closes the background file.

Figure 6:
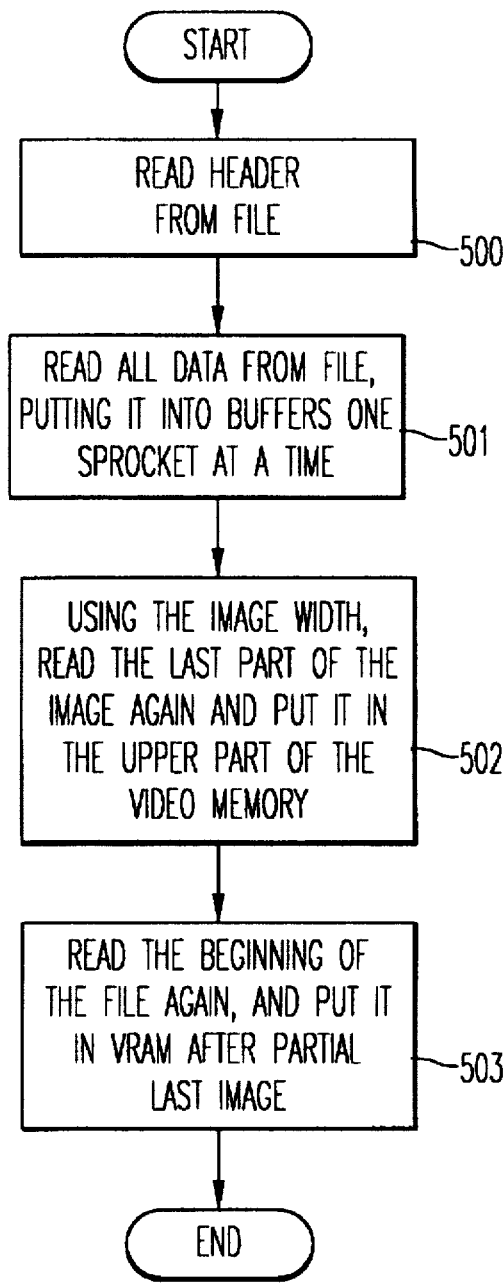
FIG. 6 is a flowchart that shows how a captured background is read from a file and written to video memory in order to produce a circular virtual world.

FIG. 6 provides greater detail on step 403. Step 500 reads the header from the file that was opened by step 401. Step 501 reads the data out in blocks and places it in the video memory. Steps 502 and 503 reread parts of the background file and write them into the video memory to form a circular image.

Figure 7:
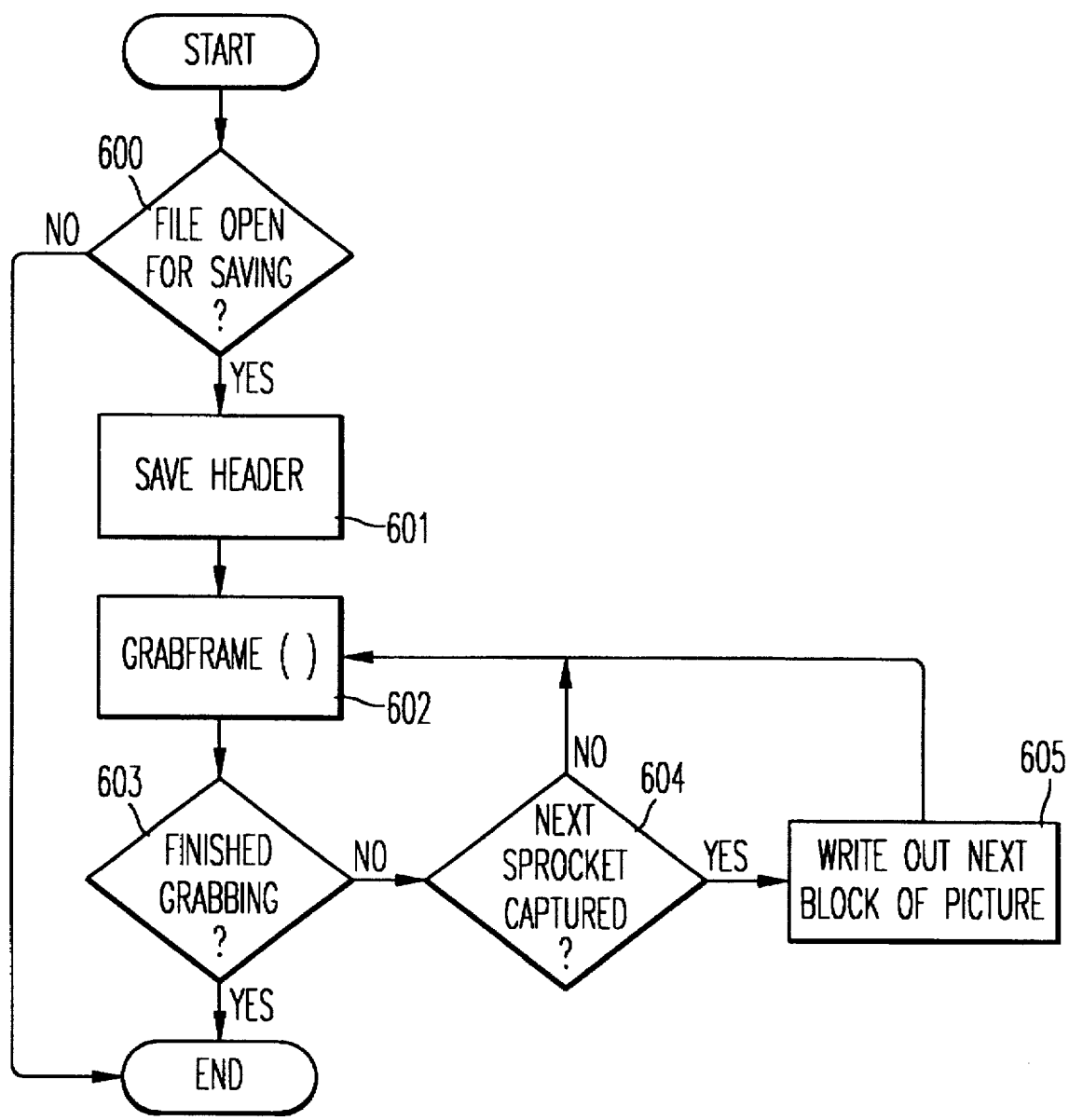
FIG. 7 is a flowchart which represents saving a captured picture to a file to be displayed later.

FIG. 7 is a sub-step of step 308 and illustrates how the invention captures new data from a camera to be used as a background image. Step 600 attempts to open a file to which it can save the image being captured. If a file is not open or cannot be opened, this process terminates. If a file is open, a header describing the image is written to the file in step 601. A series of image blocks are captured by step 602 and written by step 605 to the file until step 603 determines that enough data has been captured. Step 604 controls the block size of the image that step 605 writes.

Figure 8:
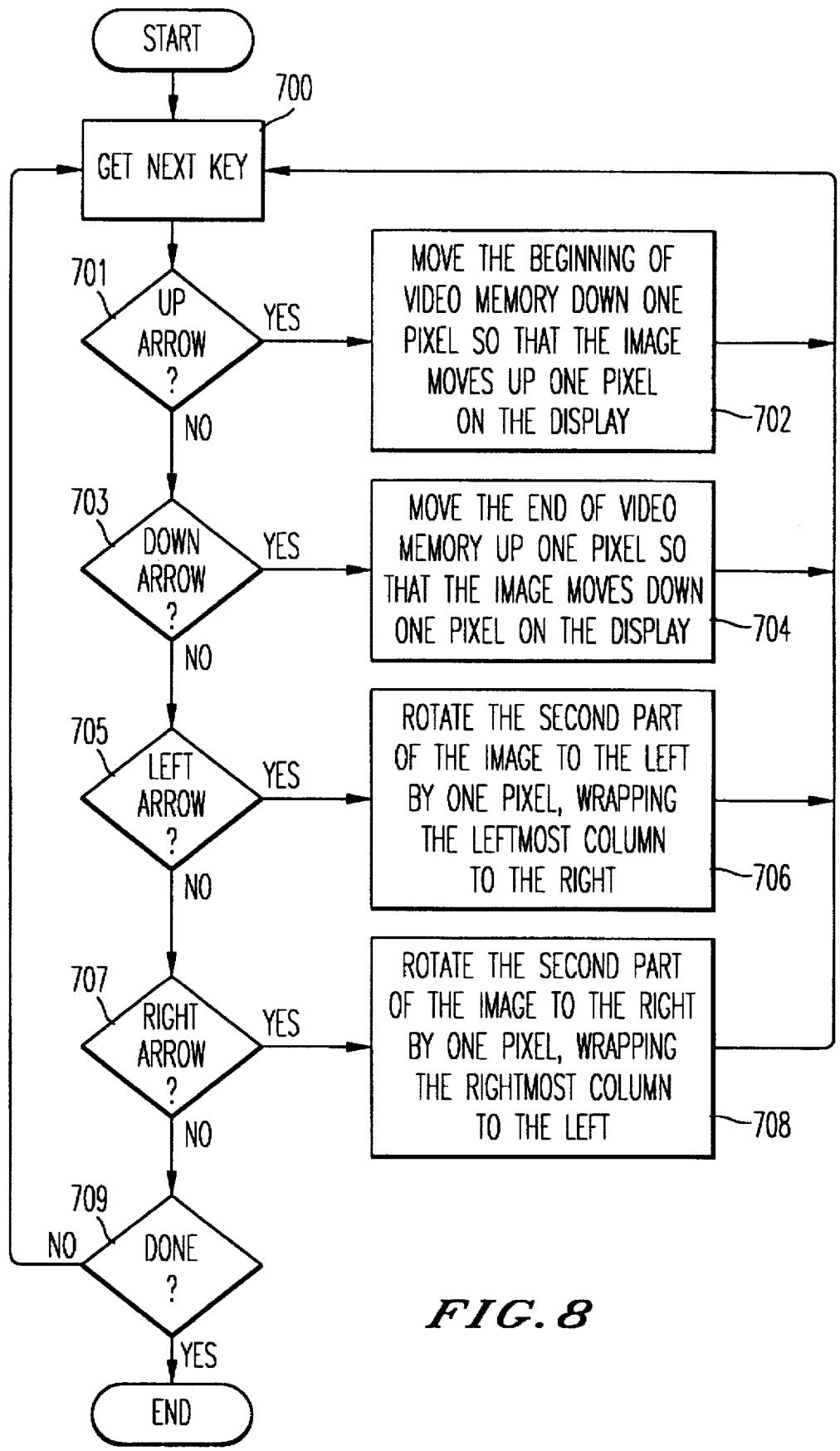
FIG. 8 is a flowchart which represents how a previously stored image can be manipulated to create a 360° virtual image by altering the horizontal and vertical positions of the image in video memory.

FIG. 8 illustrates the method of horizontally and vertically aligning an image in video memory to make a circular background. Step 700 determines the direction of the adjustment, and steps 701, 703, 705 and 707 determine if steps 702, 704, 706 and 708 should move the image up, down, left or right respectively. Step 709 determines if the user has decided to leave the image in its current configuration and quit; otherwise, more adjustments can be made by returning to step 700.

Figure 9:
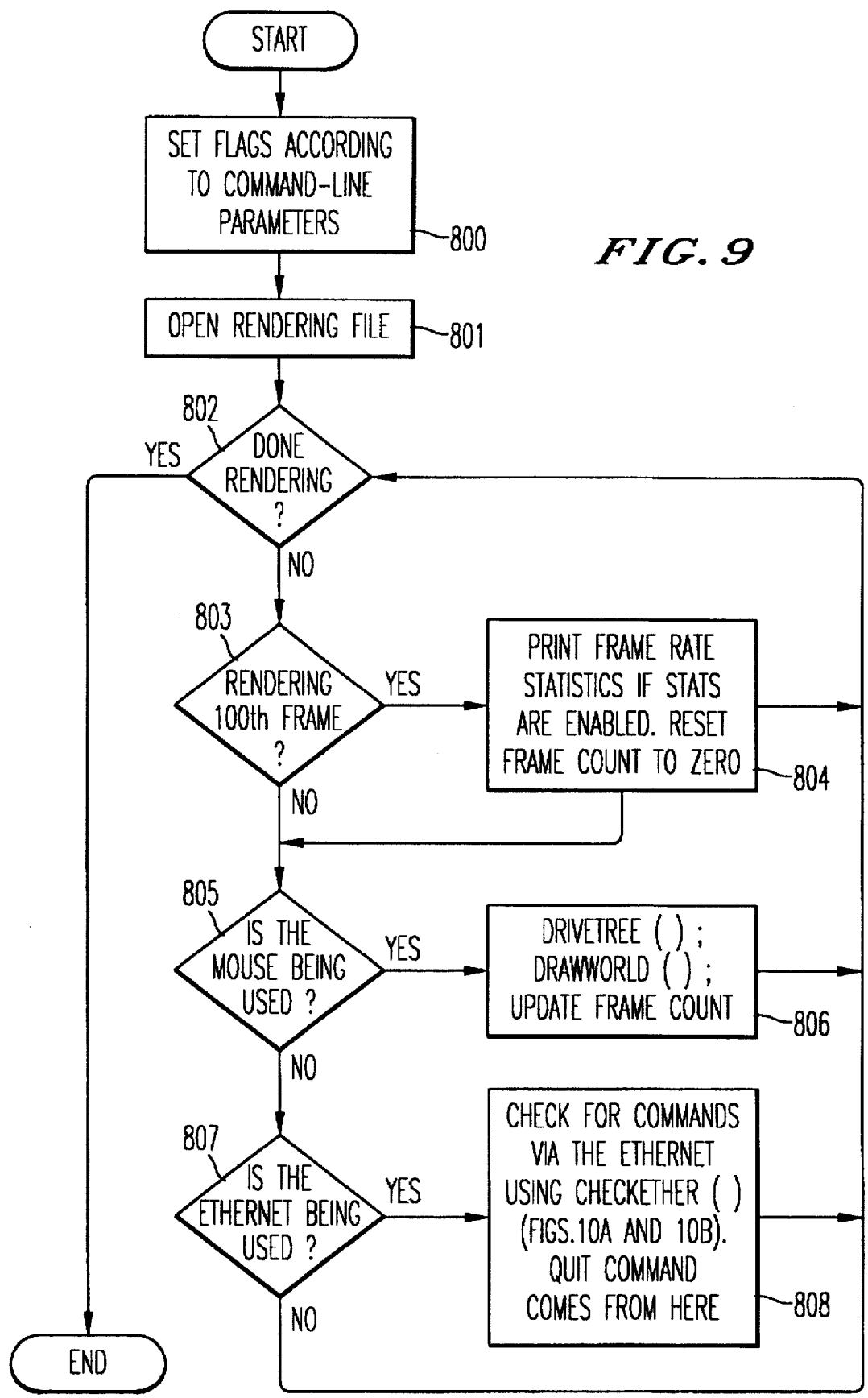
FIG. 9 is a flowchart which represents a software embodiment capable of receiving commands to update the virtual world displayed to a user.

FIG. 9 illustrates another part of the invention which controls how computer generated graphics are rendered and manipulated in order to create a virtual world. Step 800 determines what options the user would like to modify when rendering the virtual world. Step 801 opens the file that contains parts of the virtual world to render. Step 802 determines if the user has requested that the invention finish rendering the virtual world. If the user has not indicated his or her desire to stop, the process continues with step 803. Step 803 determines if it is time to update the frame rate statistics using step 804. Step 805 checks if the mouse is being tracked, and if it is, step 806 updates the virtual world based on the position of the mouse. Step 807 determines if the invention has received any commands to alter the virtual world from an outside computer via a communications interface. If a command have arrived, it is processed by step 808. Part of Step 808 includes checking to see if the invention has been requested to stop the simulation.

Figure 10A:
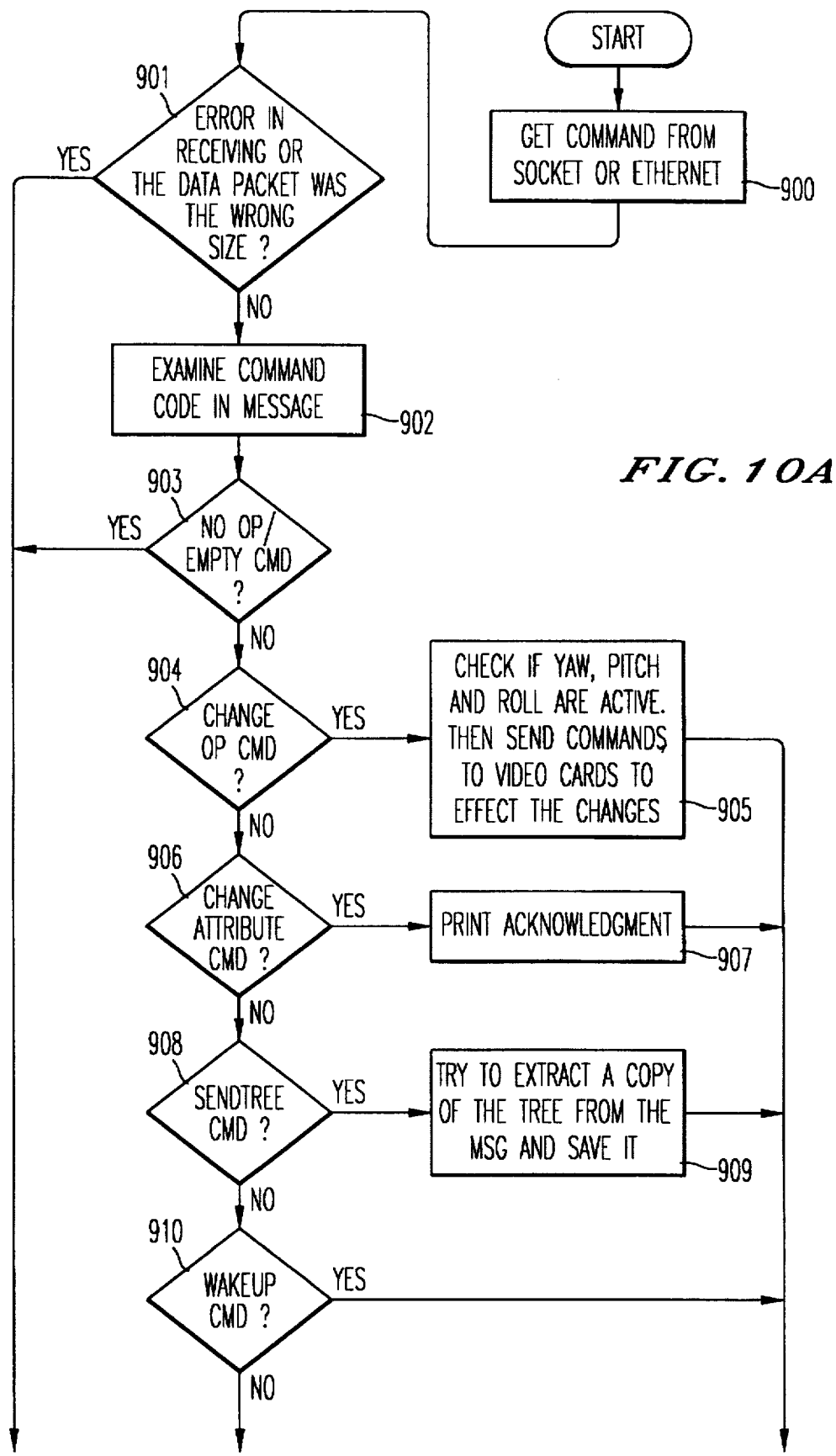
FIGS. 10A and 10B are flowcharts which represent how an embodiment of the present invention could receive commands and process them in order to change the virtual world which a user sees.
Figure 10B:
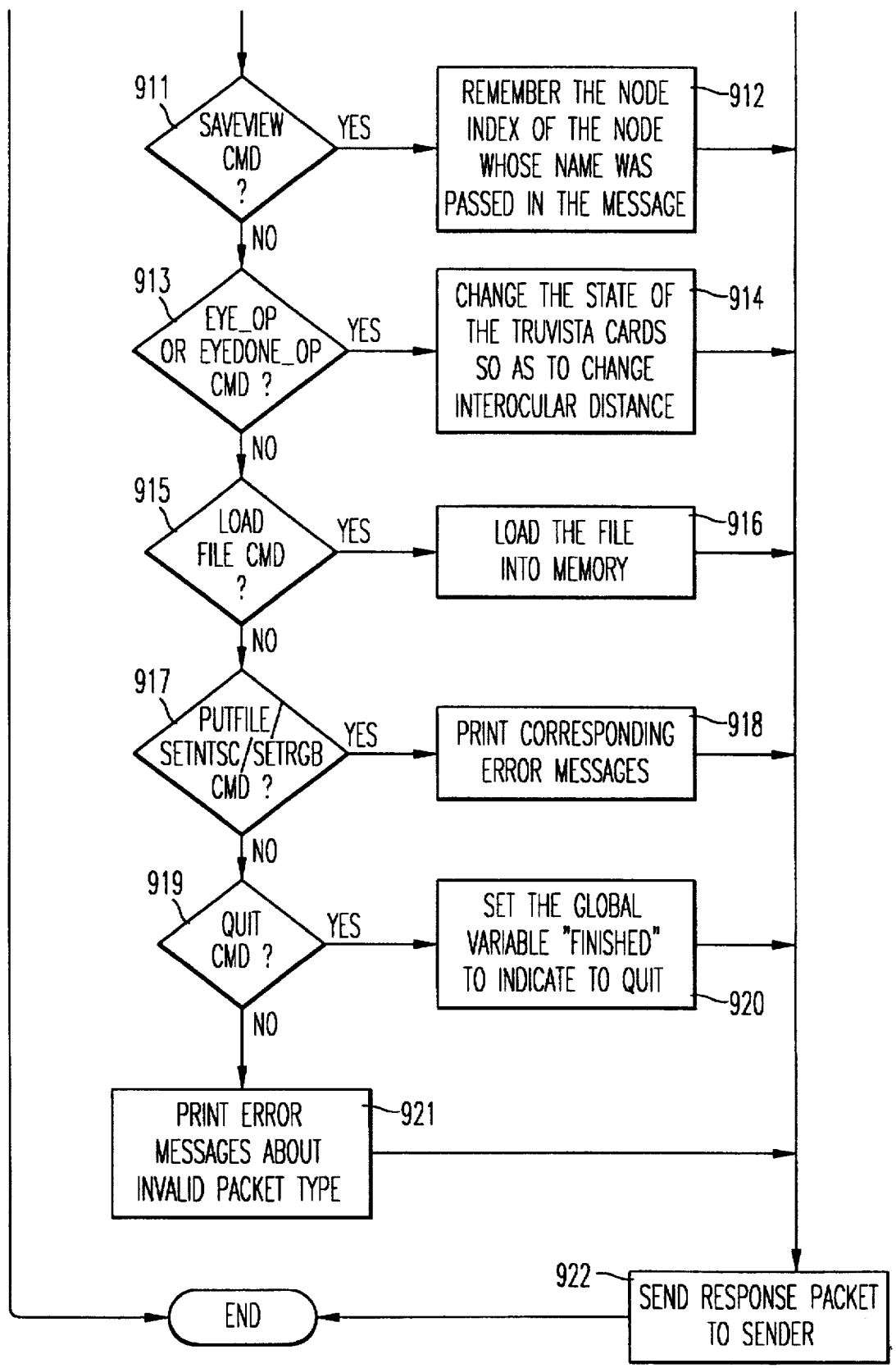

FIGS. 10A and 10B illustrate in greater detail step 808 and how commands from a communications interface are processed. Step 900 reads a command from the communications interface if it is available. Step 901 determines if a message was available and of the expected size. If not, this process stops; if so, in step 902 the type of message received is determined. If there is nothing to do based on the message, step 903 goes to the end of the process. If a command was received, step 904 checks to see if the command requires a change in the processing of yaw, pitch or roll, and if so, proceeds to make the changes in step 905. If step 906 finds that the command was to change a node attribute, an acknowledgement is printed (step 907). If step 908 determines that the command requests that the hierarchical tree of virtual reality points be saved, a copy is saved by step 909. Step 910 is used to periodically reactivate the invention. Step 911 determines if the command contains a node name, and if so, Step 912 remembers the index into an internal table that represents that node. Step 913 determines if the image display configuration is to be updated, and step 914 performs any required updates. Step 915 determines if a new file is to be made part of the virtual reality environment, and if so, step 916 loads it. Steps 917 and 918 check for messages which the current invention does not support and prints error messages if the command was unsupported. If the command was a request to quit, step 919 invokes sub-step 920 which stores an indication that it is time to quit. Step 921 prints an error message if it is called because all valid messages have been processed already, so the current message must be an invalid or unsupported message. Steps 905, 907, 909, 910, 912, 914, 916, 918, and 920 are all followed by sending an acknowledgement to the computer that sent the request.

Figure 11A:
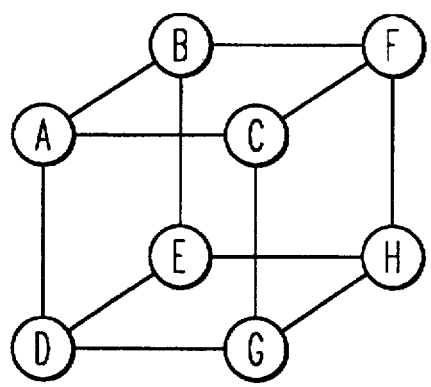
FIG. 11A shows a cube as it would appear in a virtual reality system.
Figure 11B:
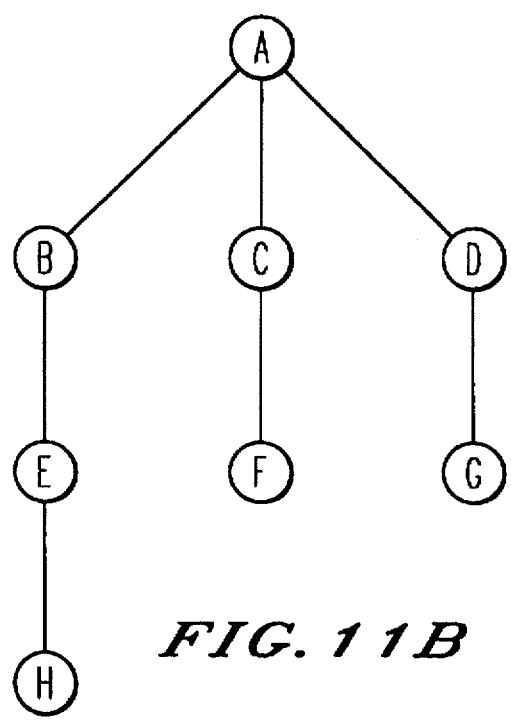
FIG. 11B shows a hierarchy of points which can be used to represent the cube.

FIG. 11A shows a cube to be rendered in a virtual reality system according to the present system. The cube is composed of eight vertices labeled A–H. FIG. 11B shows the cube in its point hierarchy form, where vertex A is the root vertex of the cube of FIG. 11A and vertices B, C and D, are connected to vertex A as child vertices. The hierarchy continues with vertex E being connected to vertex B, vertex F being connected to vertex C and vertex G being connected to D. Finally, vertex H is connected to vertex E, although it could have been attached to vertex F or G also. By arranging the vertices in a point hierarchy, the virtual reality system is instructed on the order in which to render the points.

Figure 12:
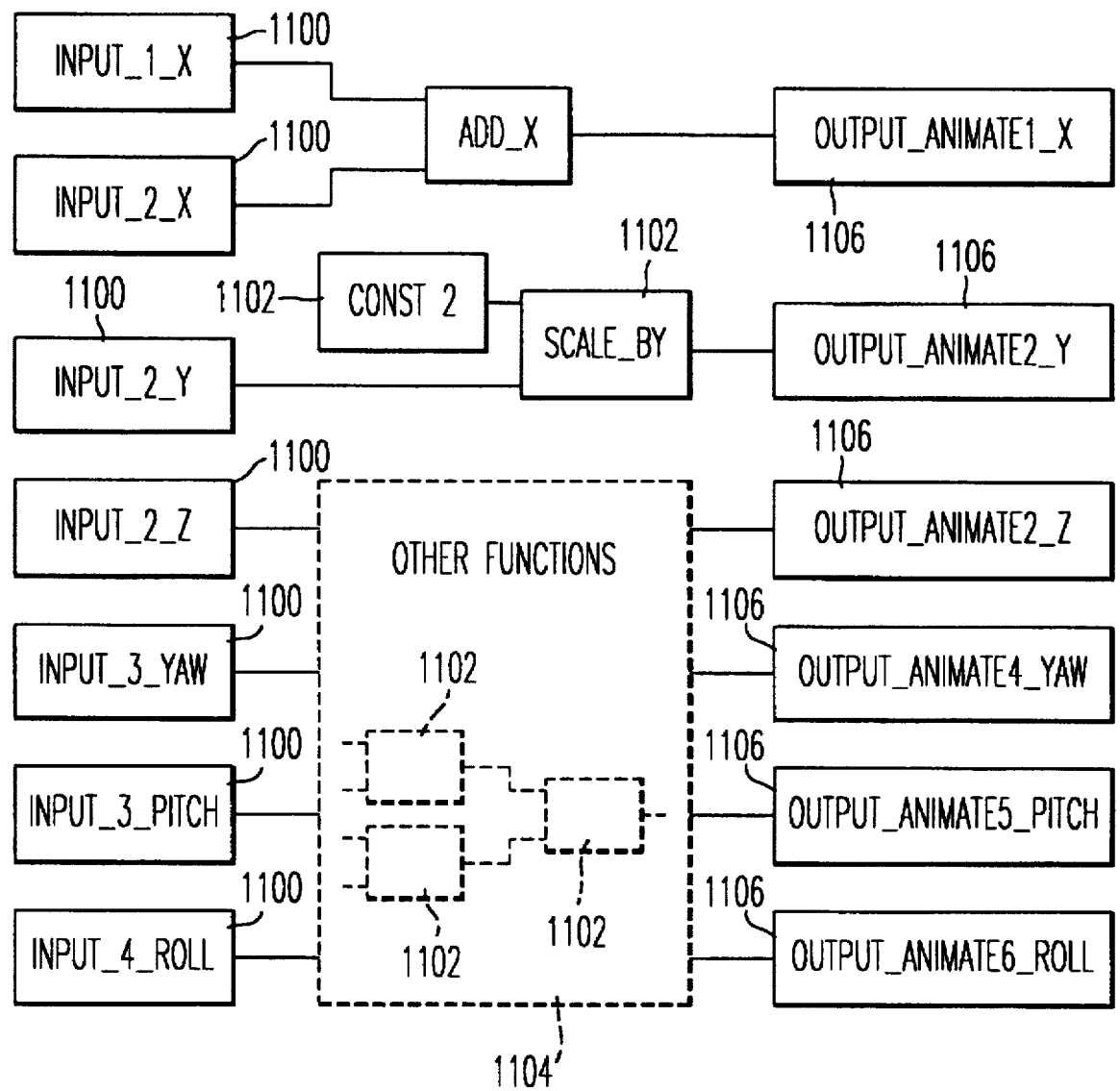
FIG. 12 is a schematic which shows a data flow network receiving inputs, modifying the inputs with user-specified functional units and outputting from the functional units part of the position or orientation of the animated points.

FIG. 12 shows a data flow network with input units 1100 connected to functional units 1102 which calculate output values 1106. Furthermore, functional units 1102 can be combined or cascaded, as in 1104, to further modify the input values to generate output values 1106. The functional units can represent and implement any mathematical formula stored in the library of formulae, such as addition, substraction, multiplication, sin, cos, exclusive or, etc. The output units 1106 are combined according to which point they are part of, to represent the position and orientation of the points in the hierarchy of animated points. For example, all the calculated values for point A are combined to determine the position (x,y,z) of point A along with its orientation (yaw, pitch, roll). All the points are combined in this way to create a visual display of an animated image.

Figure 13:
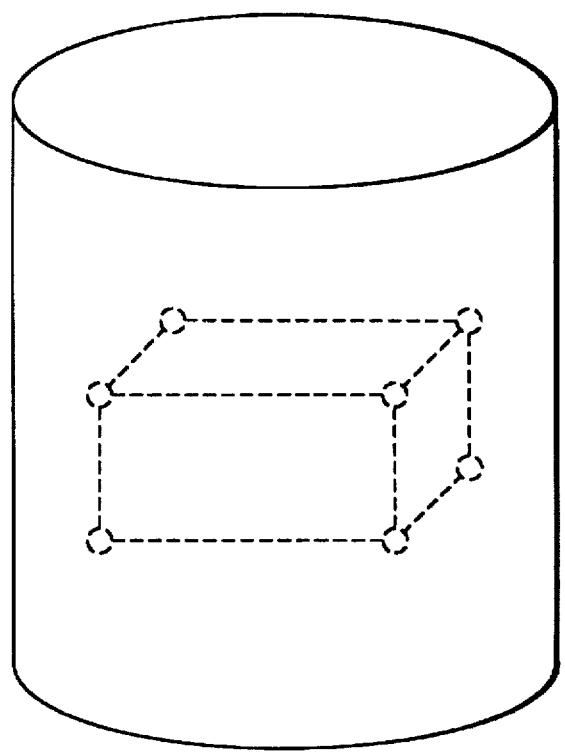
FIG. 13 is a schematic which shows the cube rendered in a virtual reality system with a background being represented as a cylinder which is also viewable from the virtual reality system.

FIG. 13 shows the combination of the animated image and the background image according to the present invention. The observer of the virtual reality system would believe that he was inside the cylinder, with the interior wall of the cylinder representing the background image. Therefore, an observer could walk around the animated cube and the portion of the background seen by the observer would change according to the observer's orientation. However, because the background is a static image, the background is only subject to yaw, pitch and roll, but not to scaling. This enables the system to provide a realistic background behind the animated objects of a virtual reality system.

Figure 14A:
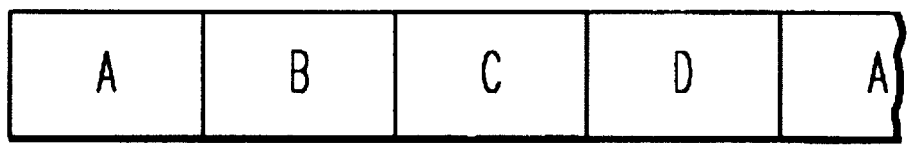
FIG. 14a is a schematic illustration of a cylindrical image with a portion of the image on the left hand side repeated at the right hand side to create a wrap around effect in a matrix in a computer memory.
Figure 14B:
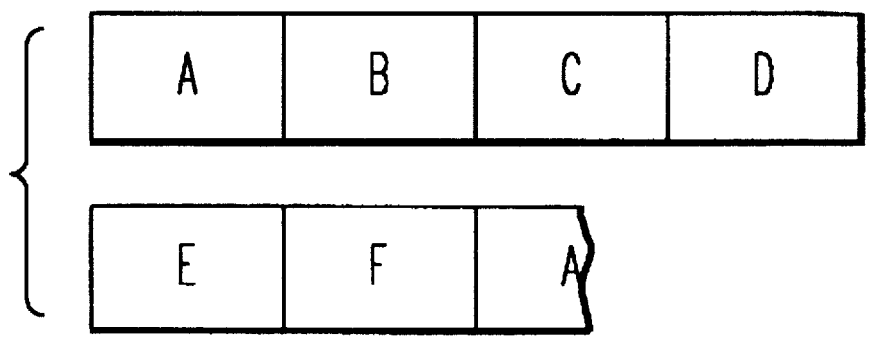
FIG. 14b is a schematic illustration which shows two sub-matrices which are combined into a single, logical matrix where a portion of the left hand side of the first sub-matrix is repeated at the end of the second sub-matrix to produce the cylindrical effect in a cylindrical image.

As shown in FIGS. 14a and 14b, the cylindrical image is created by filling in a matrix of computer memory locations a sub-portion or strip at a time. A sub-portion may be a user specifiable number of pixels wide. If the matrix is split into sub-matrices in order to fit the entire cylindrical image in the video memory of the display, the left edge of sub-matrix after the first sub-matrix is a continuation of the right edge of the first sub-matrix. To provide a cylindrical effect, when an observer's view goes past the right edge of the cylindrical image, the observer is shown the picture contained in the left edge of the matrix again.

In a case where a single matrix is used, if enough additional unused memory is available to the right of the right edge of the matrix of values, the matrix of values is updated with data copied from the left edge of the matrix. This provides an increase in speed in producing the cylindrical or "wrap-around" effect. For example, if the matrix representing the cylindrical image contained ABCD and there was additional space, a portion of the values representing a picture ABCD, starting at the left, would be repeated, giving, as shown in FIG. 14a, ABCD and a repeated portion of A.

As shown in FIG. 14b, in a case where multiple submatrices are used because the cylindrical image is wider than a single frame of video memory, a portion of the values from the first sub-matrix are added to the end of the last sub-matrix to provide the cylindrical effect. Thus, in the case shown in FIG. 14a, the portion of the right edge before the repeated part of the image, forms a continuation of the left edge of the matrix. In the case shown in FIG. 14b, the portion of the right edge of the last sub-matrix before the repeat part of image forms a continuation of the left edge of the first sub-matrix. This provides the advantage of always being able to generate a complete portion of the cylindrical image by displaying values from a single portion of the matrix which is as wide as an observer's display. This extended cylindrical image avoids having to copy a first portion of the cylindrical image from the left hand side of the matrix or matrices and a second portion from the right hand side.

While the above is a complete description of a preferred embodiment of the present invention, various modifications may be employed. Consequently, the scope of the invention should not be limited except as described in the claims.

What is claimed is:

1. An apparatus for creating virtual worlds comprising:
a computer memory;
plural input devices;

a data flow network including an interconnection of plural input units, plural functional units and plural output units, wherein the plural input units receive input data from the plural input devices, and wherein the plural functional units are user-specifiable and receive and process the input data received by the plural input devices;

animated image receiving means for receiving data representing an animated image, wherein the animated image is represented using lines connecting plural animated points in a hierarchial tree of points, wherein the plural animated points are animated according to changing values of the plural input devices and wherein the values of the plural output units which receive the input data processed by the plural functional units determine positions of the plural animated points in three-dimensional space;

means for mapping the positions of the plural animated points into a two-dimensional animated image;

real image receiving means for receiving a real world image as a cylindrical image which surrounds a virtual user by combining sub-portions of the cylindrical image into a matrix of values in the computer memory which represents the cylindrical image, wherein a portion of the cylindrical image represented by values near a right edge of the matrix of values forms a continuation of a portion of the cylindrical image represented by values at a left edge of the matrix of values;

electronic image combining means, coupled to and receiving signals from the animated image receiving means and coupled to the real image receiving means, for creating a composite image in which the two-dimensional animated image is superimposed on the real world image.

2. The apparatus according to claim 1 further comprising a head-mounted display.

3. The apparatus of claim 1, wherein the real image receiving means comprises:

sampling means for sampling plural sub-portions of the cylindrical image with a camera which rotates in a circle; and combining means for combining the plural sub-portions into the matrix of values in the computer memory.

4. A method of creating virtual worlds, comprising the steps of:

generating a background image as a cylindrical image which surrounds a virtual user by combining sub-portions of the cylindrical image into a matrix of values in a computer memory which represents the cylindrical image, wherein a portion of the cylindrical image represented by values near a right edge of the matrix of values forms a continuation of a portion of the cylindrical image represented by values at a left edge of the matrix of values;

receiving sampled values from plural input devices;

generating a data flow network including an interconnection of plural input units, plural functional units and plural output units, wherein the plural input units receive input data from the plural input devices, and wherein the plural functional units are user-specifiable and receive and process the input data received by the plural input units;

generating a hierarchical tree of points;

generating at least one animated image, wherein said at least one animated image is represented using lines connecting plural animated points in the hierarchical tree of points, wherein the plural animated points are animated according to changing values of the plural input devices and wherein the values of the plural output units which receive the input data processed by the plural functional units determine positions of the plural animated points in three-dimensional space;

mapping the positions of the plural animated points into a two-dimensional animated image;

combining electronically a portion of said background image and a portion of said at least one two-dimensional animated image to form a combined image; and displaying said combined image to an observer.

5. The method of claim 4, wherein the step of generating a background image generates the background image so as to be perceived at a constant distance from said observer, regardless of a position or movement by said observer.

6. The method of claim 4, further comprising the steps of:

receiving signals representing a current orientation of said observer;

altering said at least one animated object to be a new representation of said at least one animated object corresponding to said current orientation of said observer;

combining said new representation of said at least one animated object with a portion of said background image corresponding to said current orientation of said observer so as to form a new combined image; and displaying said new combined image to said observer.

7. The method of claim 6, wherein the step of generating a background image generates the background image so as to be perceived at a constant distance from said observer, regardless of a position or movement by said observer.

8. The method of claim 4, wherein the step of generating the background image comprises the steps of:

sampling plural sub-portions of the cylindrical image with a camera which rotates in a circle; and combining the plural sub-portions into the matrix of values in the computer memory.

9. An apparatus for creating virtual worlds, comprising:

plural input devices;

means for generating a background image as a cylindrical image which surrounds a virtual user by combining sub-portions of the cylindrical image into a matrix of values in a computer memory which represents the cylindrical image, wherein a portion of the cylindrical image represented by values near a right edge of the matrix of values forms a continuation of a portion of the cylindrical image represented by values at a left edge of the matrix of values;

means for generating a data flow network including an interconnection of plural input units, plural functional units and plural output units, wherein the plural input units receive input data from the plural input devices, and wherein the plural functional units are user-specifiable and receive and process the input data received;

means for generating a hierarchical tree of points;

means for generating at least one animated image, wherein said at least one animated image is represented using lines connecting plural animated points in the hierarchical tree of points, wherein the plural animated points are animated according to changing values of the plural input devices and wherein the values of the plural output units determine positions of the plural animated points in three-dimensional space;

means for mapping the positions of the plural animated points into a two-dimensional animated image;

means for combining electronically a portion of said background image and a portion of said at least one two-dimensional image to form a combined image; and means for displaying said combined image to an observer.

10. The apparatus of claim 9, wherein said means for generating a background image generates the background image so as to be perceived at a constant distance from said observer, regardless of a position or movement by said observer.

11. The apparatus of claim 9, further comprising:

means for receiving signals representing a current orientation of said observer;

means for altering said at least one animated object to be a new representation of said at least one animated object corresponding to said current orientation of said observer;

means for combining said new representation of said at least one animated object with a portion of said background image corresponding to said current orientation of said observer so as to form a new combined image; and means for displaying said new combined image to said observer.

12. The apparatus of claim 11, wherein said means for generating a background image generates the background image so as to be perceived at a constant distance from said observer, regardless of a position or movement by said observer.

13. The apparatus of claim 9, wherein the means for generating the background image comprises:

sampling means for sampling plural sub-portions of the cylindrical image with a camera which rotates in a circle; and combining means for combining the plural sub-portions into the matrix of values in the computer memory.

* * * * *